US009045126B2

(12) United States Patent  
Harty

(10) Patent No.: US 9,045,126 B2  
(45) Date of Patent: Jun. 2, 2015

(54) METHOD OF OPTIMIZING ENERGY USE OF A POWER PLANT USING GEOGRAPHICAL INFORMATION WITHOUT USER INPUT TO THE NAVIGATION SYSTEM

(75) Inventor: Ryan Harty, Long Beach, CA (US)

(73) Assignee: Honda Motor Co., LTD., Tokyo (JP)

( * ) Notice: Subject to any disclaimer, the term of this patent is extended or adjusted under 35 U.S.C. 154(b) by 56 days.

(21) Appl. No.: 13/290,837

(22) Filed: Nov. 7, 2011

(65) Prior Publication Data

US 2013/0116870 A1  May 9, 2013

(51) Int. Cl.
*B60W 10/06* (2006.01)
*B60W 10/08* (2006.01)
*B60W 20/00* (2006.01)

(52) U.S. Cl.
CPC ........... *B60W 10/06* (2013.01); *B60W 10/08* (2013.01); *B60W 20/00* (2013.01); *Y02T 10/6286* (2013.01); *B60W 2550/12* (2013.01); *B60W 2550/141* (2013.01); *B60W 2550/20* (2013.01); *B60W 2550/22* (2013.01); *B60W 2550/402* (2013.01); *B60W 2550/406* (2013.01); *B60W 20/104* (2013.01)

(58) Field of Classification Search
CPC ..... B60W 10/06; B60W 10/08; B60W 20/00; B60W 2550/12; B60W 2550/20; B60W 2550/22; B60W 2550/141; B60W 2550/402; B60W 2550/406; B60K 6/445; Y02T 10/6286
USPC ......................................................... 701/22
See application file for complete search history.

(56) References Cited

U.S. PATENT DOCUMENTS

| | | | |
|---|---|---|---|
| 5,742,922 A | 4/1998 | Kim | |
| 6,005,494 A | 12/1999 | Schramm | |
| 6,445,308 B1 * | 9/2002 | Koike | 340/902 |
| 6,487,477 B1 | 11/2002 | Woestman et al. | |
| 6,591,185 B1 | 7/2003 | Polidi et al. | |
| 6,861,957 B2 * | 3/2005 | Koike | 340/903 |
| 7,539,562 B2 | 5/2009 | Maguire et al. | |
| 7,665,559 B2 | 2/2010 | De La Torre-Bueno | |
| 7,925,426 B2 * | 4/2011 | Koebler et al. | 701/123 |
| 8,190,318 B2 * | 5/2012 | Li et al. | 701/22 |
| 8,301,323 B2 * | 10/2012 | Niwa | 701/22 |
| 8,386,169 B2 * | 2/2013 | Nguyen | 701/423 |
| 8,408,341 B2 * | 4/2013 | Dalum et al. | 180/65.22 |
| 2002/0188387 A1 * | 12/2002 | Woestman et al. | 701/22 |
| 2007/0294026 A1 | 12/2007 | Schirmer | |
| 2008/0021628 A1 | 1/2008 | Tryon | |
| 2009/0012664 A1 | 1/2009 | Christ | |

OTHER PUBLICATIONS

Katsargyri, G-E., "Optimally Controlling Hybrid Electric Vehicles using Path Forecasting," May 23, 2008, Dept. of Electrical Engineering and Computer Science, Massachusetts Institute of Technology, Cambridge, USA, sixty-five pages. [Online] [Retrieved Sep. 2010] Retrieved from the Internet <URL:http://dspace.mit.edu/bitstream/handle/1721.1/44455/297119374.pdf?sequence=1.>.

* cited by examiner

*Primary Examiner* — James Trammell  
*Assistant Examiner* — James E Stroud  
(74) *Attorney, Agent, or Firm* — Fenwick & West LLP

(57) ABSTRACT

A telematics-navigation device detects that a hybrid vehicle propelled by at least two energy sources is traveling to a destination not provided to the vehicle (i.e., an unknown destination). As the vehicle travels to the destination, the device identifies a road segment between a current position of the vehicle and a next road junction that vehicle is traveling towards. A control unit determines an optimization strategy for managing the energy sources of the vehicle as the vehicle travels the road segment. The control unit executes the determined strategy.

20 Claims, 6 Drawing Sheets

METHOD OF OPTIMIZING ENERGY USE OF A POWER PLANT USING GEOGRAPHICAL INFORMATION WITHOUT USER INPUT TO THE NAVIGATION SYSTEM

FIELD OF THE EMBODIMENTS

The embodiments generally relate to hybrid vehicles and more particularly to managing the energy sources of a hybrid vehicle.

BACKGROUND

A hybrid vehicle use two or more distinct energy sources for propulsion of the vehicle. For example, currently the most common hybrid vehicles are hybrid electric vehicles which are powered by an internal combustion engine and at least one electric motor. The internal combustion engine typically operates using a type of combustible fuel and the electric motor operates using electric energy. Therefore, when traveling, a hybrid vehicle has to decide how much of each energy source to use for propelling the vehicle.

When a hybrid vehicle is traveling to a destination and is aware of the route that will be taken to the destination, the vehicle can determine for the route a strategy for managing the energy sources of the vehicle. The strategy can be determined based on information of the route. However, typically a driver does not provide the vehicle with the destination because the driver already knows how to reach the destination (e.g., commuting to work). Since the vehicle does not know the destination or the route that will be taken, the vehicle is not able to determine a strategy for efficiently managing the energy sources of the vehicle.

Thus, there is a need for a way to be able to efficiently manage the energy sources of a hybrid vehicle even when the driver has not provided the vehicle with a destination or a route being taken to reach the destination.

SUMMARY

The embodiments provide a computer based method, one or more computer readable storage mediums, and an energy optimization system for managing at least two energy sources used to propel a hybrid vehicle. A telematics-navigation device detects that the hybrid vehicle is traveling to a destination not provided to the vehicle (i.e., an unknown destination). As the vehicle travels to the destination, the device identifies a road segment between a current position of the vehicle and a next road junction that vehicle is traveling toward. A control unit determines an optimization strategy for managing the energy sources of the vehicle as the vehicle travels the road segment. The control unit executes the determined strategy.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the present subject matter.

Figure 1:
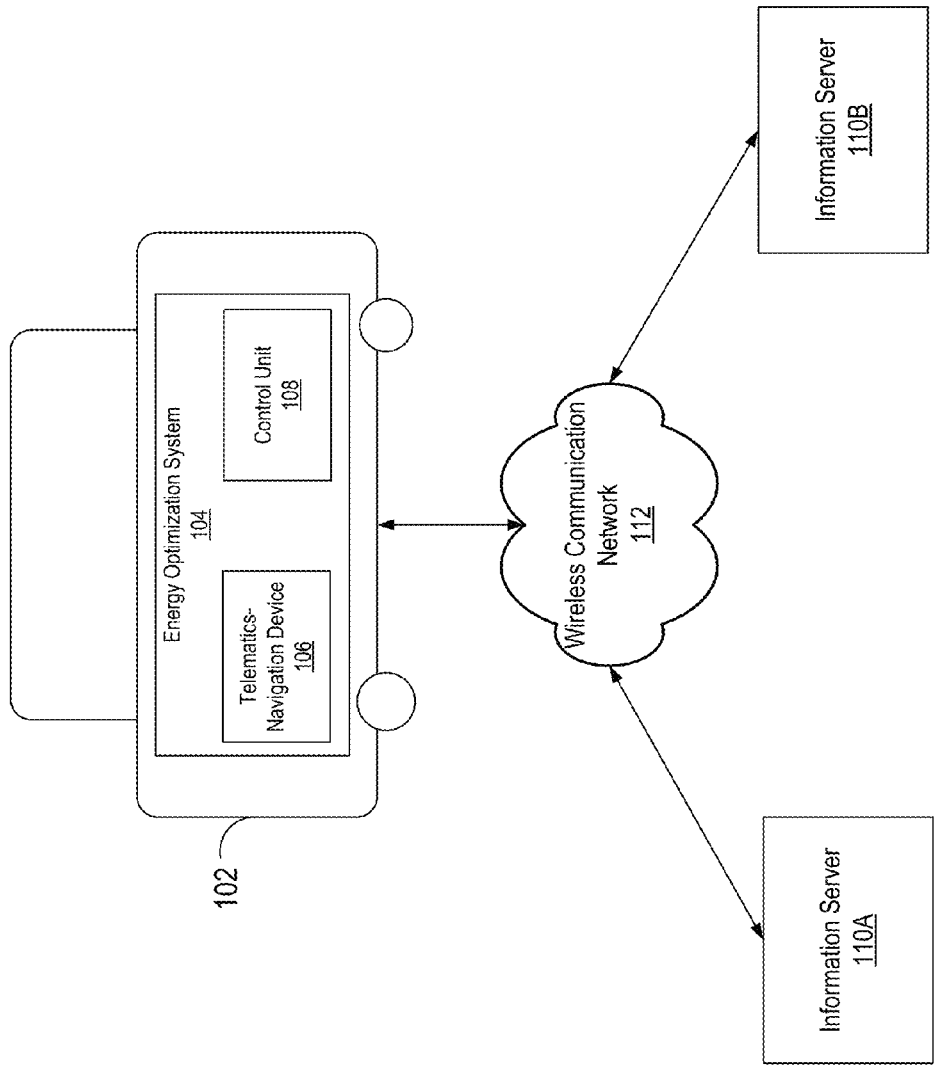
FIG. 1 is a high-level block diagram of a vehicle communication environment according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An embodiment is now described with reference to the figures where like reference numbers indicate identical or functionally similar elements. In the figures, a letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A," and/or "110B" in the figures).

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

The embodiments also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

FIG. 1 is a high-level block diagram of a vehicle communication environment 100 according to one embodiment. FIG. 1 illustrates a hybrid vehicle 102 and information servers 110 connected by a wireless communication network 112.

The hybrid vehicle 102 represents a vehicle that uses at least two distinct energy sources for propelling the vehicle 102. Each energy source powers an engine which allows the vehicle to move. In one embodiment, the vehicle 102 is a hybrid electric vehicle that uses a type of chemical fuel (e.g., gasoline, diesel, ethanol, hydrogen, etc) and stored energy (e.g., electric or mechanical). The chemical fuel powers an internal combustion engine or fuel cell of the vehicle 102 and the electric energy powers an electric motor of the vehicle 102. In one embodiment, the electric energy is stored in one or more rechargeable batteries on-board the vehicle 102. In one embodiment, the batteries are charged using one or more of the following: regenerative braking, an electric generator, or by connecting the vehicle 102 to an outside power source (e.g., connecting vehicle 102 to a charging station that draws power from a power grid).

The hybrid vehicle 102 includes an energy optimization system 104 that determines optimization strategies for how to use the vehicle's energy sources as the vehicle 102 travels to a destination. The energy optimization system 104 determines an optimization strategy using information about the route that the driver is taking to the destination, such as geographic and traffic information of the route. Even if the destination that the vehicle 102 is traveling to is unknown by the energy optimization system 104, the energy optimization system 104 can still determine strategies for those road segments that the energy optimization system 104 knows the vehicle 102 will have to travel on while traveling to the unknown destination.

For example, assume the vehicle 102 is traveling to an unknown destination on a highway and the vehicle 102 just drove past an exit. The energy optimization system 104 can determine that while traveling to the unknown destination, the vehicle 102 will have to travel the road segment between the exit that has just been passed and the next exit because there are no road junctions in between. Accordingly, the energy optimization system 104 can then determine a strategy for that road segment even though the destination being traveled to is unknown. It should be understood that what is meant by unknown destination or the destination not being known by the energy optimization system 104 is that a user (e.g., driver or a passenger of the vehicle 102) has not provided the destination to the energy optimization system 104.

The energy optimization system 104 includes a telematics-navigation device 106 and a control unit 108. The telematics-navigation device 106 provides a driver with directions to a destination. When a destination is provided to the telematics-navigation device 106, the telematics-navigation device 106 determines a route from the current position of the vehicle 102 to the destination. The telematics-navigation device 106 provides the route to the control unit 108 so it can determine and execute one or more optimization strategies for the route. Additionally, the telematics-navigation device 106 provides the driver with directions along the route so that the vehicle 102 can reach the destination.

However, if the vehicle 102 begins to travel and a destination was not provided to the telematics-navigation device 106 (i.e., the vehicle 102 is traveling to an unknown destination), the telematics-navigation device 106 continuously identifies road segments that the vehicle 102 will have to travel on to reach the unknown destination. The telematics-navigation device 106 provides each identified road segment to the control unit 108 so that an optimization strategy can be determined and executed while traveling on the road segment.

The control unit 108 determines and executes optimization strategies. When the telematics-navigation device 106 identifies a route, the control unit 108 obtains information about the route from the service provider servers 110. Based on the information obtained, the control unit 108 determines one or more optimization strategies for how to use the vehicle's energy sources while traveling the identified route. The control unit 108 executes the strategies and vehicle 102 is propelled along the route according to the strategies. Similarly, when the telematics-navigation device 106 identifies a road segment, the control unit 108 obtains information about the segment, determines an optimization strategy for how to use the energy sources while traveling the identified segment, and executes the strategy.

The information servers 110A and 108B represent entities that provide information to the hybrid vehicle 102. In one embodiment, at least one of the information servers 110 is a geographic information system. When the information server 110 receives a request from the vehicle 102 for information on a road segment, the information server 110 retrieves the information and transmits it to the vehicle 102. The information provided for a road segment may be one or more of the following: geographic information (e.g., the gradient of the road and elevation), information on traffic conditions (e.g., current speed of vehicles, speed limit, amount of congestion, incidents), road surface type (e.g., asphalt, cobblestone, concrete, sett), and weather information (current weather conditions, amount of rain/snow in the last 24 hours). In one embodiment, if the vehicle 102 requests information for an entire route from an information server 110, the information server 110 breaks down the route into road segments and provides information for each road segment.

The wireless communication network 112 represents a communication pathway between the hybrid vehicle 102 and the information servers 110. In one embodiment, the wireless communication network 112 is a cellular network comprised of multiple base stations, controllers, and a core network that typically includes multiple switching entities and gateways. In one embodiment, the wireless communication network 112 is a wireless local area network (WLAN) that provides wireless communication over a limited area. In one embodiment, the WLAN includes an access point that connects the WLAN to the Internet. In one embodiment, the wireless communication network 112 is a combination of these.

Figure 2:
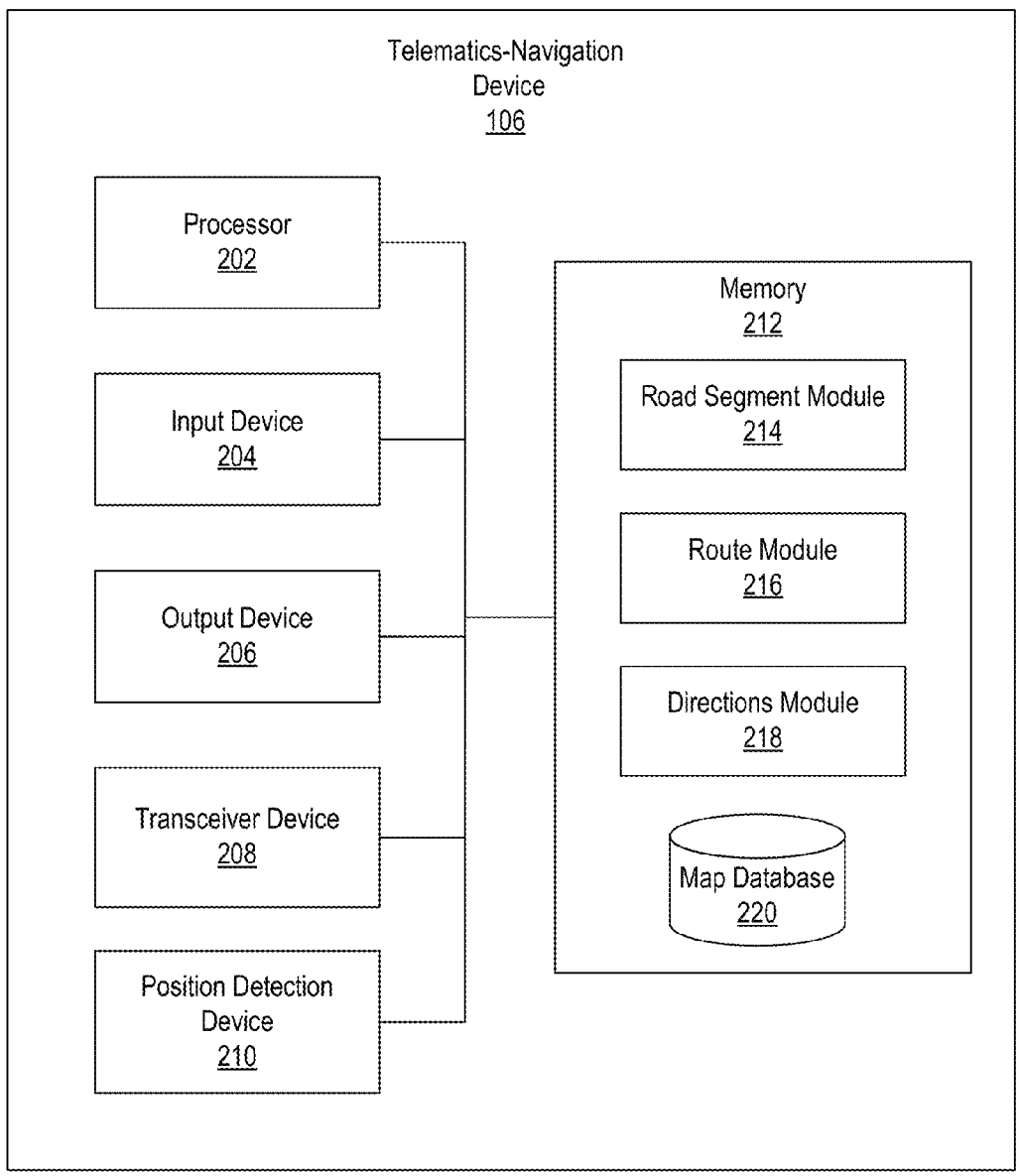
FIG. 2 is a high-level block diagram illustrating a detailed view of the telematics-navigation device according to one embodiment.

FIG. 2 is a high-level block diagram illustrating a detailed view of the telematics-navigation device 106 according to one embodiment. The telematics-navigation device 106 includes a processor 202, an input device 204, an output device 206, a transceiver device 208, a position detection device 210, and a memory 212.

The processor 202 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 202 comprises an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is any device configured to provide user input to the telematics-navigation device 106 such as, a cursor controller or a keyboard. In one embodiment, the input device 204 can include an alphanumeric input device, such as a QWERTY keyboard, a key pad or representations of such created on a touch screen, adapted to communicate information and/or command selections to processor 202 or memory 212. In another embodiment, the input device 204 is a user input device equipped to communicate positional data as well as command selections to processor 202 such as a joystick, a mouse, a trackball, a stylus, a pen, a touch screen, cursor direction keys or other mechanisms to cause movement adjustment of an image.

The output device 206 represents any device equipped to display electronic images and data as described herein. Output device 206 may be, for example, an organic light emitting diode display (OLED), liquid crystal display (LCD), cathode ray tube (CRT) display, or any other similarly equipped display device, screen or monitor. In one embodiment, output device 206 is equipped with a touch screen in which a touch-sensitive, transparent panel covers the screen of output device 206. In one embodiment, the output device 206 is equipped with a speaker that outputs audio as described herein.

The transceiver device 208 represents a device that allows the telematics-navigation device 106 to communicate with entities connected to the wireless communication network 112. In one embodiment, the telematics-navigation device 106 uses the transceiver device 208 to communicate with the information servers 110.

The position detection device 210 represents a device that communicates with a plurality of positioning satellites (e.g., GPS satellites) to determine the geographical location of the hybrid vehicle 102. In one embodiment, to determine the location of the vehicle 102, the position detection device 210 searches for and collects GPS information or signals from four or more GPS satellites that are in view of the position detection device 210. Using the time interval between the broadcast time and reception time of each signal, the position detection device 210 calculates the distance between the vehicle 102 and each of the four or more GPS satellites. These distance measurements, along with the position and time information received in the signals, allow the position detection device 210 to calculate the geographical location of the vehicle 102.

The memory 212 stores instructions and/or data that may be executed by processor 202. The instructions and/or data may comprise code for performing any and/or all of the techniques described herein. Memory 212 may be a dynamic random access memory (DRAM) device, a static random access memory (SRAM) device, Flash RAM (non-volatile storage), combinations of the above, or some other memory device known in the art. The memory 212 includes a road segment module 214, a route module 216, a directions module 218, and a map database 220. The modules included in the memory 212 are adapted to communicate with the processor 202, the input device 204, the output device 206, the transceiver device 208, and/or the position detection device 210.

The road segment module 214 identifies road segments that the vehicle 102 will travel on while traveling to an unknown destination. When the vehicle 102 begins to travel, the road segment module 214 determines whether a destination was entered through the input device 204. If a destination was not entered, the road segment module 214 uses the position detection device 210 to determine the current position of the vehicle 102 and the direction of travel. The road segment module 214 uses one or more maps stored in the map database 220 to identify a road segment between the current position of the vehicle 102 and the next road junction that the vehicle 102 is traveling towards.

A road junction is a location where the driver has an option to select which road to travel on from at least two roads. A road junction may be, for example, an exit on a highway or a location where at least two roads intersect. The road segment module 214 provides the identified road segment to the control unit 108 so that an optimization strategy can be determined as to how to manage the energy sources of the vehicle 102 as the vehicle 102 travels on the identified road segment.

When the vehicle 102 reaches the road junction, the road segment module 214 waits for the driver to select a road to travel on from the multiple roads available at the junction. Once the driver selects one of the available roads and begins to travel along the selected road, the road segment module 214 identifies the next road segment as being between the current position of the vehicle 102 and the next road junction being travelled towards. The road segment module 214 provides the next road segment to the control unit 108 so that an optimization strategy can be determined and executed for the next road segment. The process continues until the vehicle 102 reaches the unknown destination.

Figure 5:
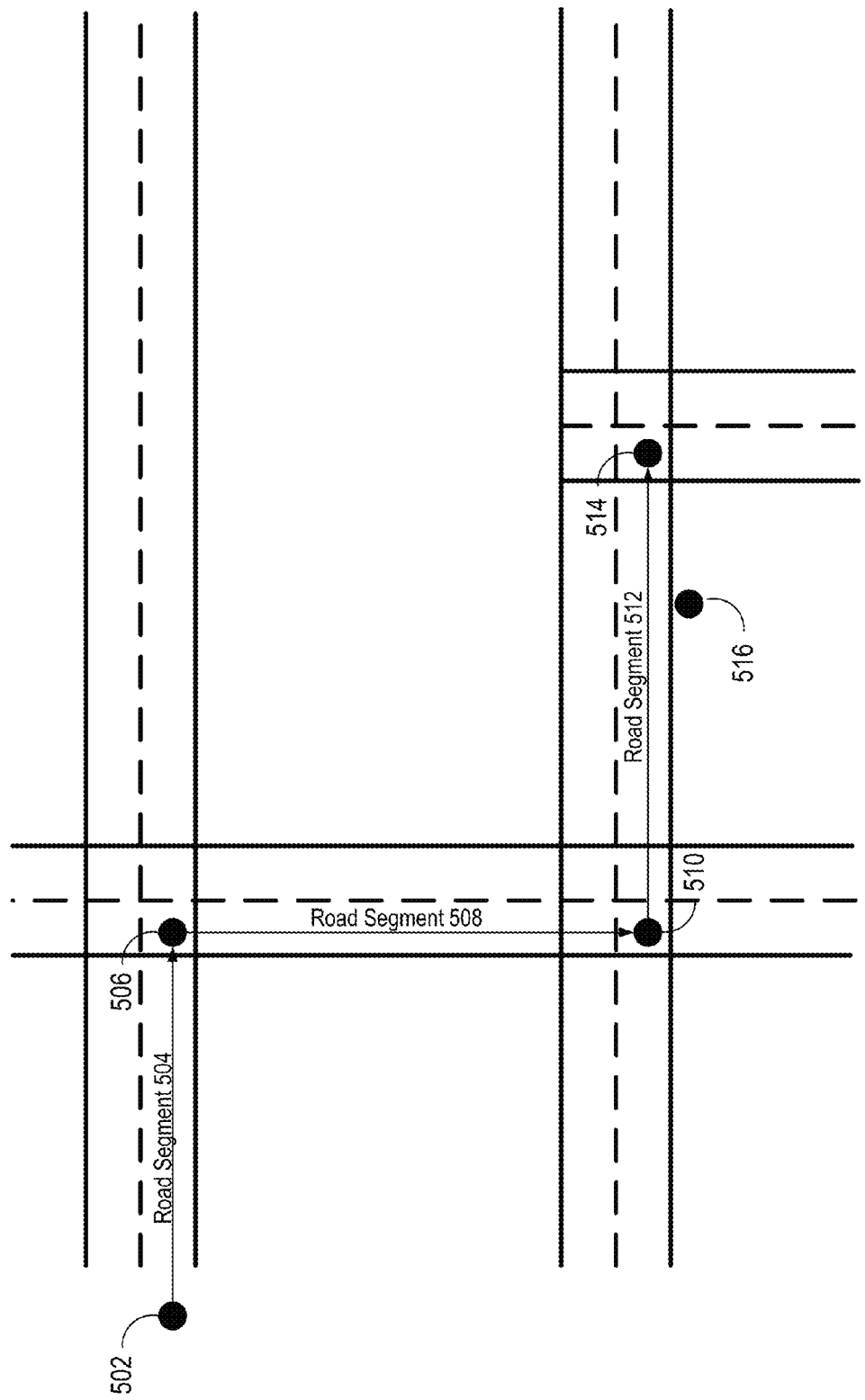
FIG. 5 illustrates the functionality of the road segment module as the vehicle travels to an unknown destination according to one embodiment.

FIG. 5 illustrates the functionality of the road segment module 214 as the vehicle 102 travels to an unknown destination. The vehicle 102 begins at location 502. As the vehicle 102 begins to travel, the road segment module 214 determines that the vehicle 102 will be traveling the road segment 504 between location 502 and road junction 506. Once the road segment module 214 identifies road segment 504, the control unit 108 determines an optimization strategy for the road segment 504 and executes the optimization strategy as the vehicle 102 travels towards road junction 506.

When the vehicle 102 reaches road junction 506 and begins to travel toward road junction 510, the vehicle 102 determines that the vehicle 102 will travel on road segment 508. The control unit 108 then determines and executes an optimization strategy for segment 508. When the vehicle 102 reaches road junction 510 and begins to travel towards road junction 514, road segment 512 is identified. An optimization strategy is determined for road segment 512 and the control unit 108 begins to execute the strategy. However, the strategy is not executed completely because the vehicle 102 stops at location 516 and is turned off. In other words, the vehicle 102 reached the unknown destination.

Thus, as the vehicle 102 travels to an unknown destination, the road segment module 214 is continuously identifying road segments that the vehicle 102 will have to travel on to reach the unknown destination. In another embodiment, instead of the road segment module 214 identifying a road segment as being between the current location of the vehicle 102 and the next road junction, the road segment module 214 identifies a road segment as the segment between the current location of the vehicle 102 and the next major road junction. In one embodiment, a major road junction is where a road intersects with a road having a minimal number of lanes (e.g., at least two lanes in one direction).

The route module 216 identifies routes to destinations. When a destination that a driver of the vehicle 102 plans to drive to is entered through the input device 204, the route module 216 selects a route for traveling to the destination. To select a route, the route module 216 requests the current geographic location of the vehicle 102 from the position detection device 210. The route module 216 uses one or more maps stored in the map database 220 to identify different routes between the current location of the vehicle 102 and the destination.

The route module 216 selects one route from the multiple routes identified for traveling to the destination. In one embodiment, the route module 216 selects the route based on criteria entered by a user, such as the fastest route, the shortest distance route, the most direct route, the least congested route, a street dominant route, a highway dominant route, or a route that minimizes energy consumption. In another embodiment, the route module 216 presents the identified routes to a user of the vehicle 102 and allows the user to select a route. The route module 216 provides the selected route to the control unit 108 so that one or more optimization strategies can be determined for the route.

In one embodiment, when the vehicle 102 travels to a destination (a destination entered through the input device 204 or an unknown destination), the route module 216 stores information about the trip to the destination. In one embodiment, the route module 216 stores one or more of the following attributes for a trip: the starting location, the destination (i.e., the ending location), the route taken to the destination, the start time of the trip, the day of the week, and the date.

In one embodiment, when the vehicle 102 begins a trip and a destination was not entered through the input device 204 (i.e., when the vehicle 102 is traveling to an unknown destination), the route module 216 attempts to predict the destination of the trip and the route to the destination. To predict the destination and the route, the route module 216 searches for stored information on similar trips using current information about the trip. For example, the route module 216 may search for trips that started at the same location, at the current time, and the current day of the week. In embodiment, the route module 216 will stop the attempt at predicting the destination if sufficient trips are not identified during the search.

Using the trips identified in the search, the route module 216 identifies previous destinations that the driver has driven to under the current conditions and the routes taken to each destination. For each destination-route pair, the route module 216 calculates a probability that the driver is currently traveling to that destination along the route using the trips identified in the search.

For example, assume that the driver has left home at 8:00 AM on a Monday. Additionally, assume that on previous Mondays when leaving home between 8:00 and 8:30 AM, the driver has driven as follows: 7 times to work using highway 101, 2 times to work using highway 280, and 1 time to Al's Grocery Store using El Camino Real. The probabilities that the route module 216 would calculate for each destination-route pair may be as follows: work-highway 101=70%, work-highway 280=20%, and Al's-El Camino Real=10%.

If the probability of a destination-route pair is above a threshold (e.g., 70%), the route module 216 predicts that the driver is currently traveling to that destination along the route. The route module 216 provides the predicted route to the control unit 108 so that one or more optimization strategies can be determined for the route.

The directions module 218 provides drivers with directions to destinations. When a user of the vehicle 102 requests directions to a destination, the directions module 218 identifies the route selected by the route module 216 for reaching the destination. The directions module 218 provides the driver of the vehicle 102 with turn by turn directions along the selected route until the destination is reached.

It should be apparent to one skilled in the art that the telematics-navigation device 106 may include more or less components than those shown in FIG. 2 without departing from the spirit and scope of the embodiments. For example, the telematics-navigation device 106 may include additional memory, such as, for example, a first or second level cache, or one or more application specific integrated circuits (ASICs). Similarly, telematics-navigation device 106 may include additional input or output devices. In some embodiments one or more of the components can be positioned in close proximity to each other while in other embodiments these components can be positioned in different locations. For example the units in memory 212 of the telematics-navigation device 106 can be programs capable of being executed by one or more processors located in other devices in the vehicle 102.

Figure 3:
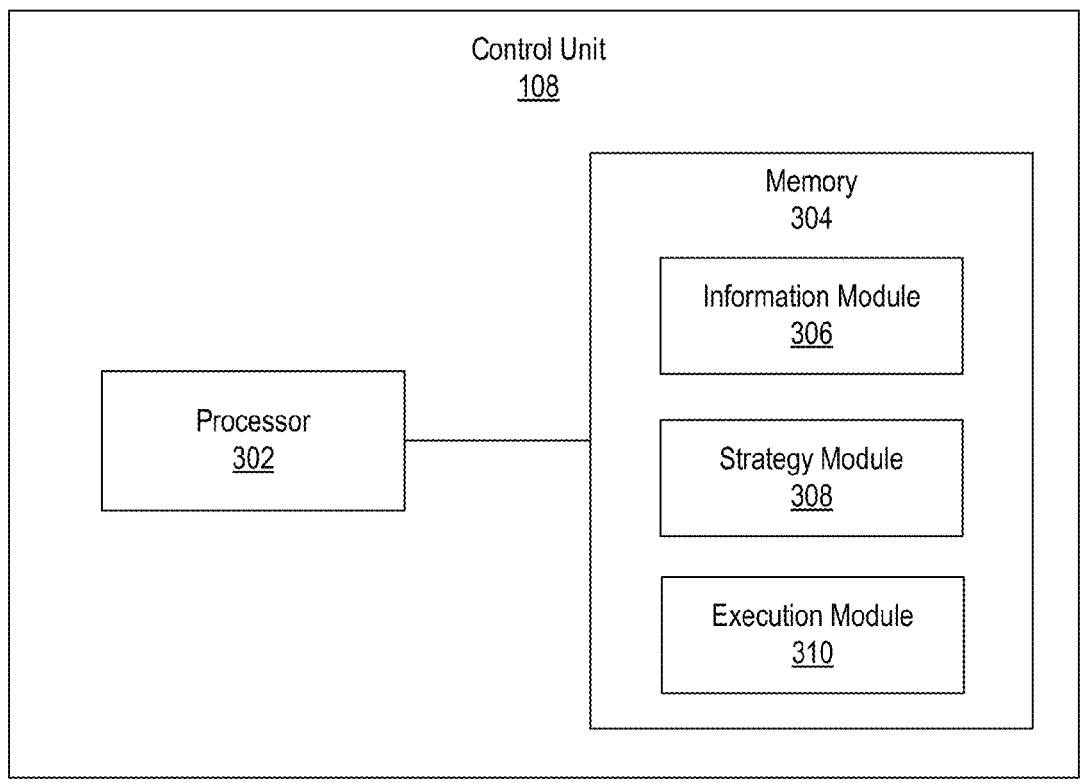
FIG. 3 is a high-level block diagram illustrating a detailed view of the control unit according to one embodiment.

FIG. 3 is a high-level block diagram illustrating a detailed view of the control unit 108 according to one embodiment. The control unit 108 includes a processor 302 and a memory 304. In one embodiment, the processor 302 and memory 304 are functionally equivalent to the processor 202 and memory 212 of the telematics-navigation device 106. The memory 304 includes an information module 306, a strategy module 308, and an execution module 310.

The information module 306 obtains information from the information servers 110. When a road segment or route is identified by the telematics-navigation device 106, the information module 306 transmits a request to one or more information servers 110 for information on the road segment or route. In one embodiment, if the telematics-navigation device 106 identified a route, the information module 306 breaks down the route into road segments and requests from the information servers 110 information on each road segment. The information received from the information servers 110 for a road segment in response to requests may include geographic information, information on traffic condition, road surface type, and weather information. In another embodiment, at least some of the road segment information is stored in a database on-board the vehicle 102 and instead of requesting that information from the information servers 110, the information module 306 searches the on-board database for the information.

The strategy module 308 determines optimization strategies for how to manage the energy sources of the vehicle 102. For a road segment identified by the telematics-navigation device 106, the strategy module 308 uses the information obtained by the information module 306 for the segment to determine an optimization strategy for how to manage the vehicle's energy sources as the vehicle 102 travels the identified road segment. In one embodiment, for a route identified by the telematics-navigation device 106, the strategy module 308 breaks down the route into road segments and determines an optimization strategy for each road segment based on the information obtained by the information module 306. In another embodiment, the strategy module 308 determines a single strategy for the entire route using the information obtained by the information module 306.

In one embodiment, an optimization strategy determined by the strategy module 308 describes a schedule for when to use each energy source, for how long, and what amount to use. In one embodiment, the strategies determined by the strategy module 308 attempt to minimize the use of at least one energy source. In one embodiment where the vehicle 102 is a hybrid electric vehicle that uses chemical fuel and electric power to propel the vehicle 102, the strategy module 308 determines optimization strategies that minimize the use of the chemical fuel.

The execution module 310 executes the optimization strategies determined by the strategy module 308. While the vehicle 102 is traveling, the execution module 310 determines which of the vehicle's energy sources to use to propel the vehicle 102. The execution module 310 determines which energy sources to use based on the optimization strategy determined by the strategy module 308 for the road segment or route being traveled on.

Figure 4:
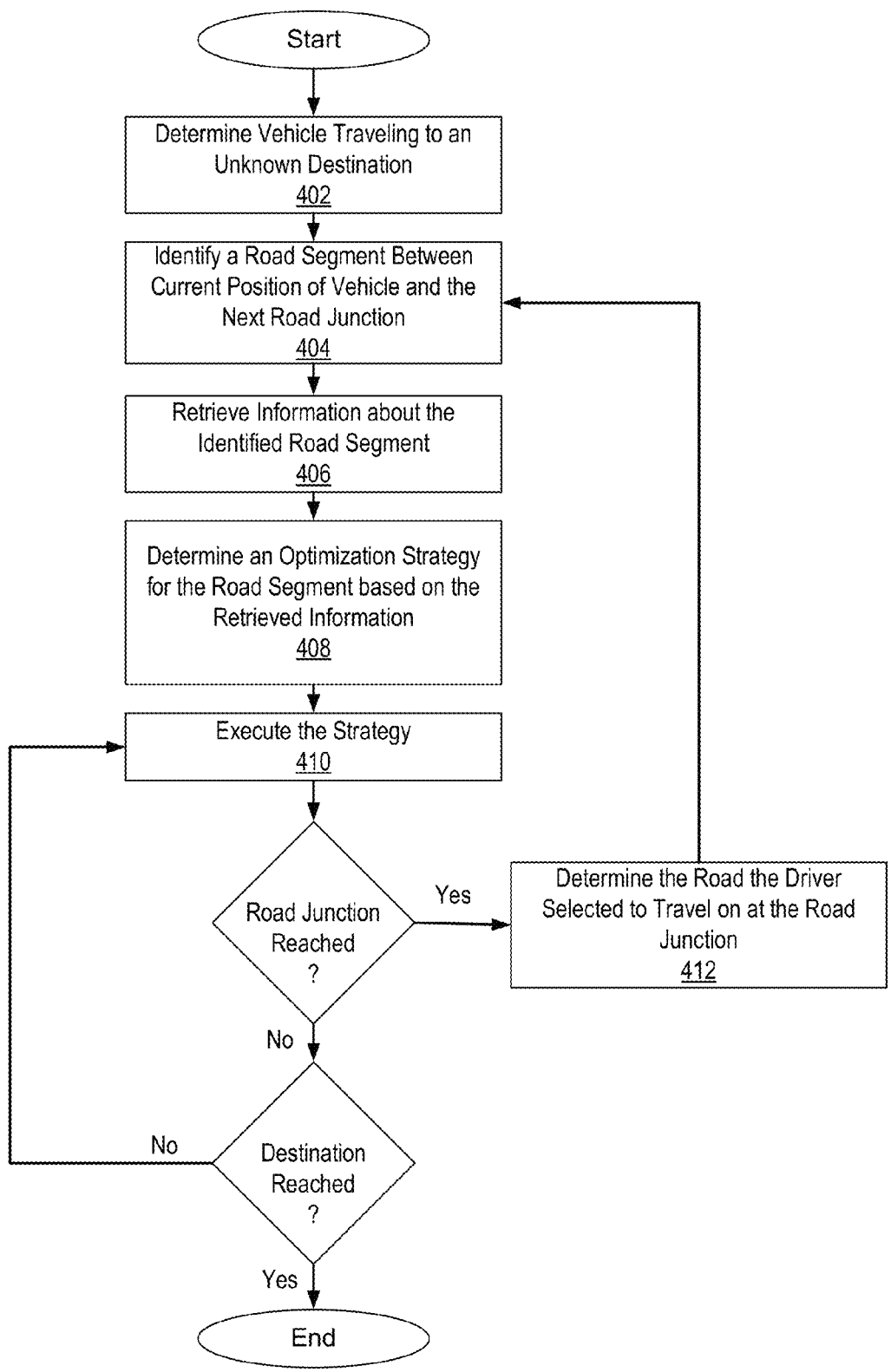
FIG. 4 is a flow chart of a method performed by the energy optimization system for managing the energy sources of the vehicle as the vehicle travels to an unknown destination.

It should be understood that by the execution module 310 controlling the use of the vehicle's energy sources, the execution module 310 is also controlling which engine or engines of the vehicle 102 are being used to propel the vehicle 102. Further, it should be apparent to one skilled in the art that the control unit 108 may include more or less components than those shown in FIG. 3 without departing from the spirit and scope of the embodiments FIG. 4 is a flow chart 400 of a method performed by the energy optimization system 104 for managing the energy sources of the vehicle 102 as the vehicle 102 travels to an unknown destination. In one embodiment, the steps of the method are implemented by the processors of the telematics-navigation device 106 and the control unit 108 executing instructions that cause the desired actions. Those of skill in the art will recognize that one or more of the method steps may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 4 in different orders. Moreover, other embodiments can include different and/or additional steps than the ones described here.

Assume for purposes of this example that the vehicle 102 started traveling and a destination was not provided to the energy optimization system 104 (i.e., the vehicle 102 is traveling to a destination not provided to the vehicle 102 or an unknown destination). The energy optimization system 104 determines 402 that the vehicle 102 is traveling to an unknown destination. The system 104 identifies 404 a road segment between the current position of the vehicle 102 and next road junction that the vehicle 102 is traveling towards. The system 104 retrieves 406 from one or more information servers 110 information for the identified road segment. The system 104 determines 408 an optimization strategy for the road segment based on the retrieved information. In one embodiment, the optimization strategy minimizes the use of the vehicle's chemical fuel.

The system 104 executes 410 the strategy as the vehicle 102 travels the road segment. Once the vehicle 102 reaches the road junction, the system 104 waits for the driver to select at the road junction a road to travel on. Once the driver selects a road to travel on, the system 312 determines 412 the road the driver 104 selected and repeats steps 402-410. The process continues until the unknown destination is reached.

Figure 6:
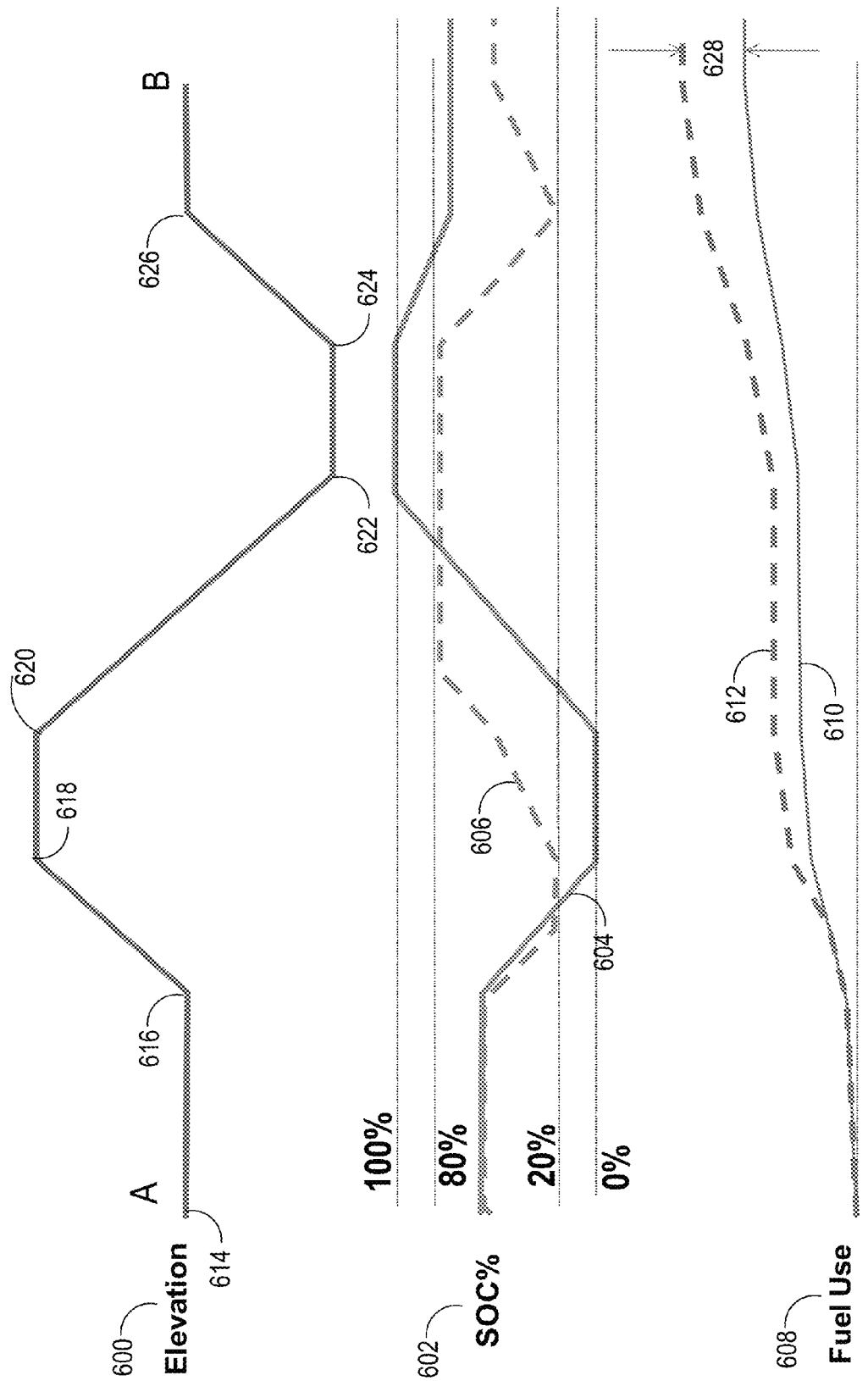
FIG. 6 illustrates the benefit of when the vehicle is traveling to an unknown destination, identifying a road segment that the vehicle will travel on and determining an optimization strategy for the segment according to one embodiment.

FIG. 6 illustrates the benefit of when the vehicle 102 is traveling to an unknown destination, identifying a road segment that the vehicle 102 will have to travel on and determining an optimization strategy for the segment. FIG. 6 additionally shows the benefit of using geographic information of a segment to determine an optimization strategy for the segment. Assume for purposes of this example that the vehicle 102 is a hybrid electric vehicle that uses electric energy and chemical fuel (e.g., gasoline) to propel the vehicle 102.

Graph 600 illustrates the elevation of the road segment at different locations. Graph 602 illustrates the amount of electric energy (i.e., the amount of charge) in the electric batteries of the vehicle 102, where 100% signifies that the batteries are full of charge and 0% signifies that batteries are fully uncharged. Line 604 of graph 602 illustrates how the charge of the batteries would be used if the road segment that the vehicle 102 will travel on was not identified and as a result no optimization strategy was determined for the segment (referred to in this example as normal conditions). Line 606 illustrates the usage of the charge according to an optimization strategy determined for the road segment, where the strategy minimizes fuel usage. Graph 608 illustrates the usage of the vehicle's chemical fuel. Line 610 illustrates the usage of chemical fuel under normal conditions. Line 612 illustrates the usage of the chemical fuel according to the optimization strategy.

The vehicle 102 travels from location 614 to location 616. Not much charge or fuel is used while traveling to location 616 because it is a short distance and there are no elevation changes between the two locations. At location 616 the vehicle 102 starts traveling uphill. As can be seen in graph 602, the vehicle 102 starts using the electric charge of the batteries. However, under normal conditions the vehicle 102 only allows the batteries to discharge to 20% because the vehicle 102 does not know when it will be able to recharge the batteries. It is more beneficial for the vehicle 102 to keep the remaining 20% for something like quick acceleration. As a result, once the charge goes down to 20%, more fuel has to be used to propel the vehicle 102.

On the other hand, in line 606, since the vehicle 102 has information on the segment, the vehicle 102 allows the charge to go down to 0%. It allows the charge to get that low because it knows it will soon be going downhill at location 620 and will be able to recharge the batteries through regenerative braking. As a result less fuel is used while traveling to location 618 as shown by line 610 of graph 608.

When the vehicle 102 is traveling downhill to location 622, under normal conditions the vehicle 102 only allows the batteries to charge up to 80%. The vehicle only allows the batteries to charge up to 80% because the vehicle 102 does not know when charge will be used again and it is bad for batteries to be at 100% for a long period of time. Being at 100% for a long period of time make the batteries susceptible to being overcharged, or cause accelerated degradation due to high electrode potentials. On the other hand, in line 606, the vehicle 102 allows the batteries to charge up to 100% because it knows charge will soon be used again to go uphill at location 624.

Thus, by identifying the road segment that the vehicle 102 will have to travel on while traveling to the unknown destination, the energy sources of the vehicle 102 can managed more efficiently to save fuel. Arrows 628 in graph 608 show the amount of fuel that is saved in this example by identifying the road segment and being able to determine an optimization strategy for the segment using geographic information.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments present disclosure without departing from the spirit and scope of the disclosure.

The invention claimed is:

1. A computer-implemented method for managing at least two energy sources used to propel a hybrid vehicle, the method comprising:
   detecting, by a device, that the vehicle is traveling, wherein a final destination that the vehicle is traveling toward is not provided to the vehicle;
   responsive to the detecting, as the vehicle travels to the final destination:
      determining, upon the vehicle reaching a first position, a first road junction that the vehicle is travelling towards with no other road junction between the first position and the first road junction;
      identifying a first road segment of a road as being between the first position of the vehicle and the first road junction;
      determining, after entering the first road segment, a first optimization strategy only for the first road segment and not for other road segments, the first optimization strategy for managing the energy sources of the vehicle as the vehicle travels the first road segment;
      executing the first optimization strategy for the first road segment;
      responsive to detecting the vehicle reaching the first road junction, identifying a second road segment between a second position of the vehicle and a second road junction with no other road junction between the second position and the second road junction;
      determining, after entering the second road segment, a second optimization strategy only for the second road segment and not for other road segments, the first optimization strategy for managing the energy sources of the vehicle as the vehicle travels the second road segment; and
      executing the second optimization strategy for the second road segment.

2. The method of claim 1, wherein the first optimization strategy is determined based on information retrieved for the first road segment.

3. The method of claim 2, wherein the information includes at least one of geographic information, traffic information, road surface type, and weather information.

4. The method of claim 1, wherein executing the first optimization strategy comprises controlling the use of the energy sources according to the first optimization strategy as the vehicle travels the first road segment.

5. The method of claim 1, wherein the determined first optimization strategy minimizes the usage of one of the energy sources.

6. The method of claim 1, wherein the energy sources for which the first optimization strategy is determined include at least two of the following: chemical fuel, fossil fuel, biofuel, hydrogen, ethanol, electric energy, and mechanical energy.

7. The method of claim 1, wherein the first road junction is a major road junction where a first road intersects with a second road having a minimum number of lanes in one direction.

8. An energy optimization system for managing at least two energy sources used to propel a hybrid vehicle, the system comprising:
   a telematics-navigation device configured to:
      detect that the vehicle is traveling, wherein a final destination that the vehicle is traveling toward is not provided to the vehicle;
      responsive to detecting that the vehicle is traveling, as the vehicle travels to the final destination:
         determine, upon the vehicle reaching a first position, a first road junction that the vehicle is travelling towards with no other road junction between the first position and the first road junction;
         identify a first road segment of a road as being between the first position of the vehicle and the first road junction; and
   a control unit configured to:
      determine, after entering the first road segment, a first optimization strategy only for the first road segment and not for other road segments, the first optimization strategy for managing the energy sources of the vehicle as the vehicle travels the first road segment; and
      execute first optimization strategy for the first road segment
   the telematics-navigation device further configured to responsive to detecting the vehicle reaching the first road junction, identify a second road segment between a second position of the vehicle and a second road junction with no other road junction between the second position and the second road junction; and
   the control unit further configured to:
      determine, after entering the second road segment, a second optimization strategy only for the second road segment and not for other road segments, the second optimization strategy for managing the energy sources of the vehicle as the vehicle travels the second road segment; and
      execute the second optimization strategy for the second road segment.

9. The system of claim 8, wherein the first optimization strategy is determined based on information retrieved for the first road segment.

10. The system of claim 9, wherein the information includes at least one of geographic information, traffic information, road surface type, and weather information.

11. The system of claim 8, wherein executing the first optimization strategy comprises controlling the use of the energy sources according to the first optimization strategy as the vehicle travels the first road segment.

12. The system of claim 8, wherein the determined first optimization strategy minimizes the usage of one of the energy sources.

13. The system of claim 8, wherein the energy sources for which the first optimization strategy is determined include at least two of the following: chemical fuel, fossil fuel, biofuel, hydrogen, ethanol, electric energy, and mechanical energy.

14. The system of claim 8, wherein the first road junction is a major road junction where a first road intersects with a second road having a minimum number of lanes in one direction.

15. One or more non-transitory computer-readable storage mediums having computer-executable code for managing at least two energy sources used to propel a hybrid vehicle, the computer-executable code comprising:
a road segment module configured to:
detect that the vehicle is traveling, wherein a final destination that the vehicle is traveling toward is not provided to the vehicle;
responsive to detecting that the vehicle is traveling, as the vehicle travels to the final destination:
determine, upon the vehicle reaching a first position, a first road junction that the vehicle is travelling towards with no other road junction between the first position and the first road junction;
identify a first road segment of a road as being between the first position of the vehicle and the first road junction;
a strategy module configured to determine after entering the first road segment, a first optimization strategy only for the first road segment and not for other road segments, the first optimization strategy for managing the energy sources of the vehicle as the vehicle travels the first road segment;
an execution module configured to execute the first optimization strategy
the road segment module further configured to responsive to detecting the vehicle reaching the first road junction, identify a second road segment between a second position of the vehicle and a second road junction with no other road junction between the second position and the second road junction;
the strategy module further configured to determine, after entering the second road segment, a second optimization strategy only for the second road segment and not for other road segments, the second optimization strategy for managing the energy sources of the vehicle as the vehicle travels the second road segment; and
the execution module further configured to execute the second optimization strategy for the second road segment.

16. The one or more computer-readable storage mediums of claim 15, wherein the first optimization strategy is determined based on information retrieved for the first road segment.

17. The one or more computer-readable storage mediums of claim 16, wherein the information includes at least one of geographic information, traffic information, road surface type, and weather information.

18. The one or more computer-readable storage mediums of claim 15, wherein the execution module is further configured to control the use of the energy sources according to the first optimization strategy as the vehicle travels the first road segment.

19. The one or more computer-readable storage mediums of claim 15, wherein the energy sources for which the optimization strategy is determined include at least two of the following: chemical fuel, fossil fuel, biofuel, hydrogen, ethanol, electric energy, and mechanical energy.

20. The method of claim 1, wherein one of the energy sources is electric energy and the determined first optimization strategy maximizes usage of the electric energy.

* * * * *